(12) United States Patent
Tomita et al.

(10) Patent No.: US 6,257,289 B1
(45) Date of Patent: Jul. 10, 2001

(54) PNEUMATIC TIRE HAVING A TRANSPONDER THEREIN, AND A METHOD OF AND A DEVICE FOR READING AND WRITING OF A TRANSPONDER

(75) Inventors: Naotaka Tomita, Saitama; Tatsuo Sugimoto, Tokyo, both of (JP)

(73) Assignee: Bridgestone Corporation, Tokyo (JP)

( * ) Notice: Subject to any disclaimer, the term of this patent is extended or adjusted under 35 U.S.C. 154(b) by 1188 days.

(21) Appl. No.: 08/571,702

(22) Filed: Dec. 13, 1995

Related U.S. Application Data

(63) Continuation of application No. 08/291,076, filed on Aug. 17, 1994.

(30) Foreign Application Priority Data

Aug. 18, 1993 (JP) ............................. 5-049304 U
Nov. 12, 1993 (JP) ............................. 5-060909 U
Nov. 12, 1993 (JP) ................................. 5-283333

(51) Int. Cl.$^7$ .................................................. B60C 09/00
(52) U.S. Cl. .................... 152/152.1; 73/146.5; 152/450; 340/442; 340/445; 343/873
(58) Field of Search ................. 152/152.1, 450; 340/442, 445; 73/146.5; 343/873

(56) References Cited

U.S. PATENT DOCUMENTS

| | | | |
|---|---|---|---|
| 4,334,215 | * 6/1982 | Frazier et al. | 340/539 |
| 4,911,217 | * 3/1990 | Dunn et al. | 152/152.1 |
| 5,025,550 | * 6/1991 | Zirbes et al. | 29/605 |
| 5,050,292 | * 9/1991 | Zirbes et al. | 29/605 |
| 5,121,748 | * 6/1992 | Ditz et al. | 128/631 |
| 5,181,975 | * 1/1993 | Pollack et al. | 152/152.1 |
| 5,223,851 | * 6/1993 | Hadden et al. | 343/873 |
| 5,252,962 | * 10/1993 | Urbas et al. | 340/870.17 |

FOREIGN PATENT DOCUMENTS

| | | | |
|---|---|---|---|
| 0505905 | 9/1992 | (EP) | G06K/19/06 |
| 0505906 | 9/1992 | (EP) | G06K/19/06 |
| 9012474 | 10/1990 | (WO) | H04Q/7/00 |

* cited by examiner

*Primary Examiner*—Francis J. Lorin
(74) *Attorney, Agent, or Firm*—Sughrue, Mion, Zinn, Macpeak & Seas, PLLC

(57) ABSTRACT

A pneumatic tire having a transponder therein comprises a pair of sidewall portions and a crown portion toroidally arranged between a pair of bead cores, and a method of reading and writing of the transponder buried in the tire, wherein the transponder is buried in a projected portion at the inner surface of a bead portion of the tire, and the axial direction of the transponder is along the circumferential direction of the tire, and a rod antenna used for receiving and transmission for the transponder is moved as an axial line of the rod antenna along the circumferential direction of the tire when the reading and writing is done from outside of the tire.

3 Claims, 17 Drawing Sheets

F I G. 1a
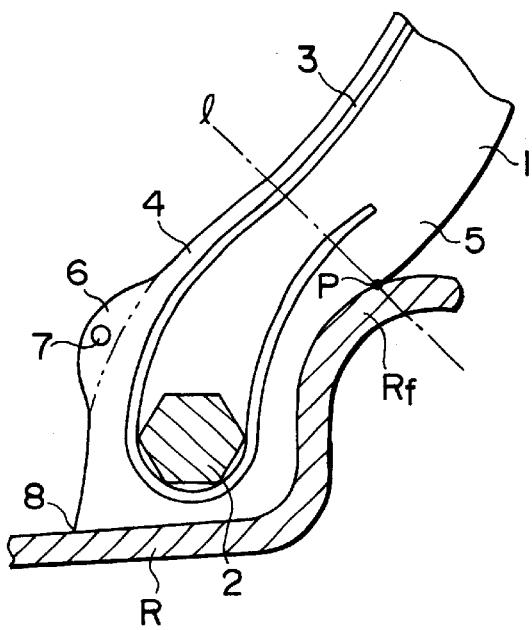
F I G. 1b
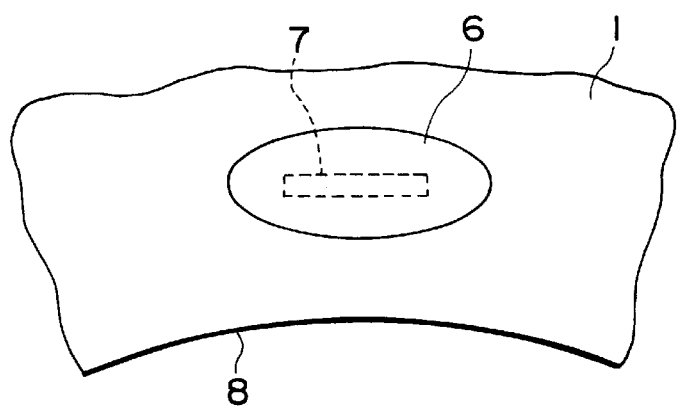

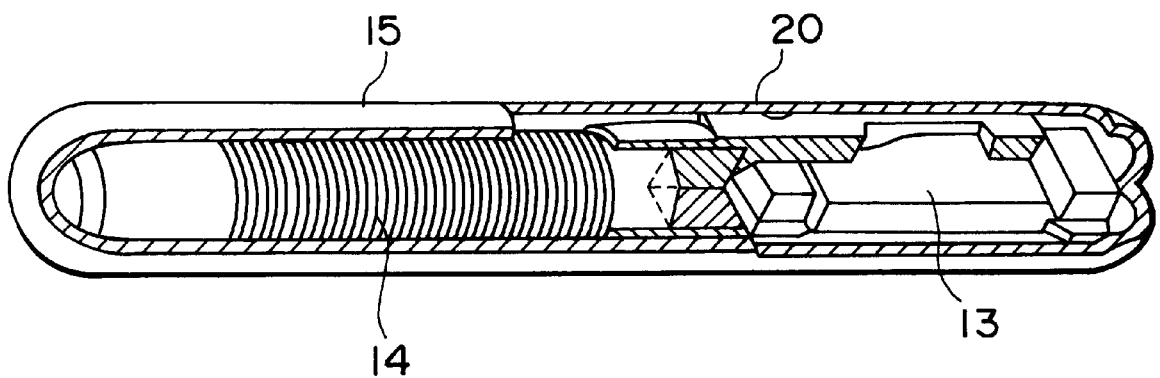
F I G. 6

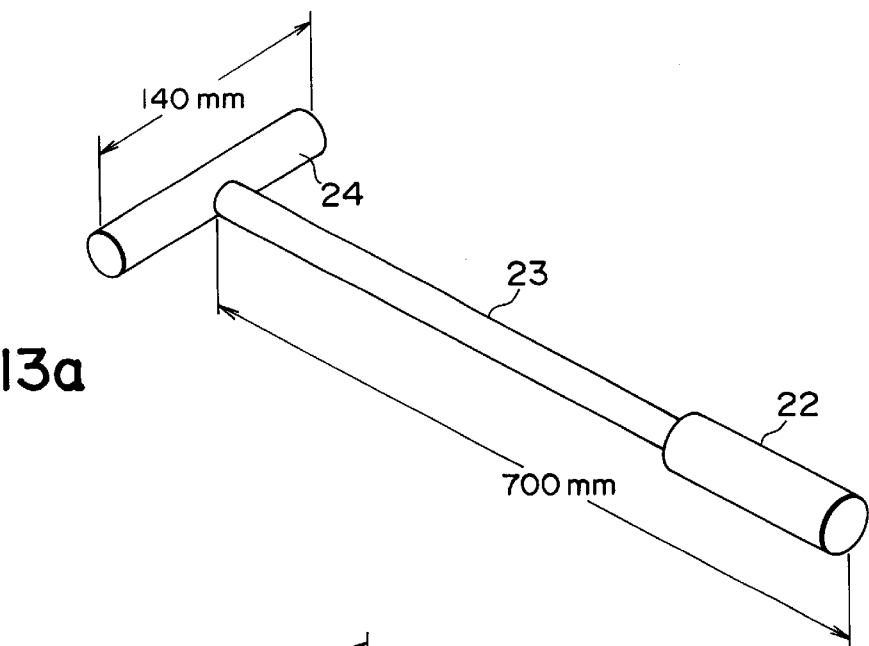
F I G. 13a
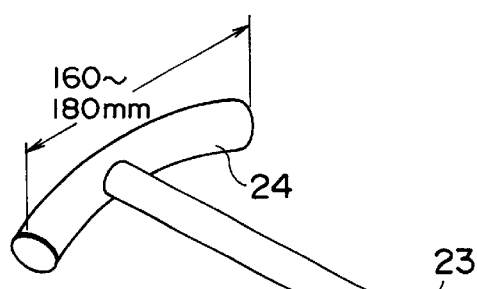
F I G. 13b
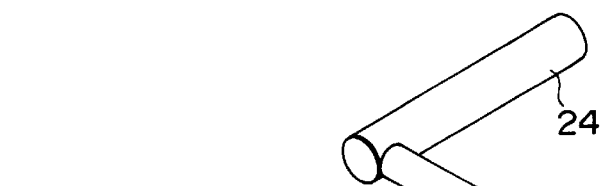
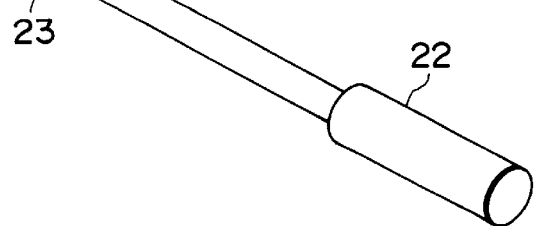
F I G. 13c

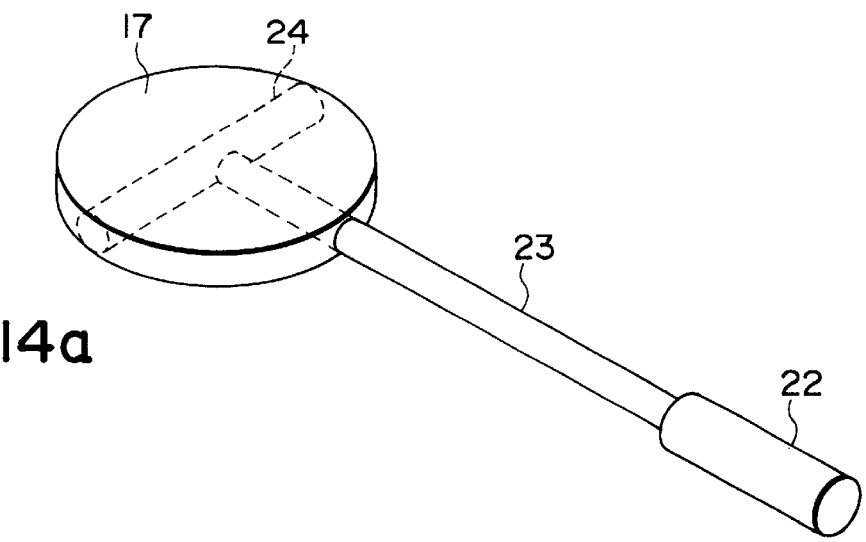
F I G. 14a
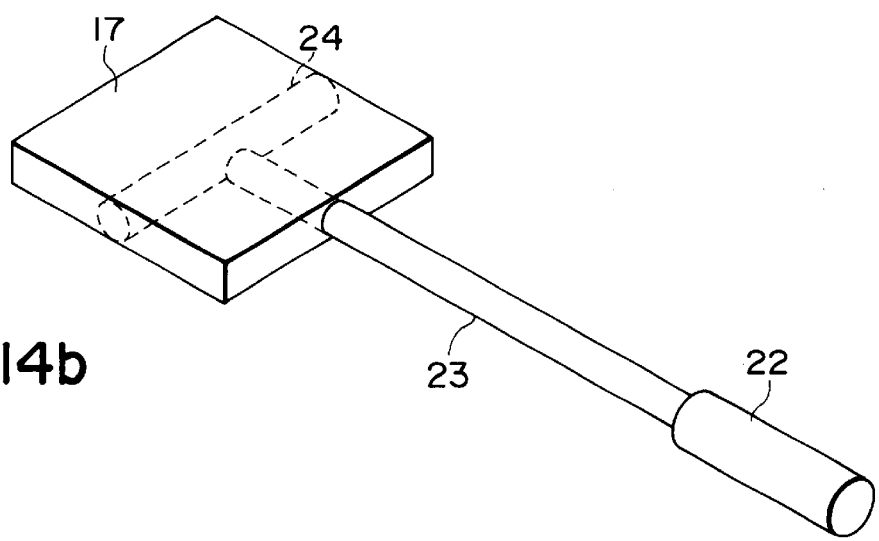
F I G. 14b

F I G. 15a
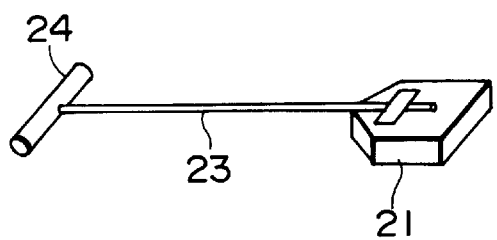
F I G. 15b
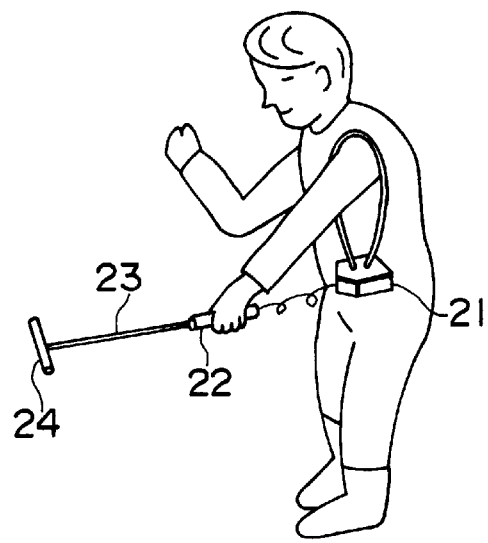
F I G. 15c
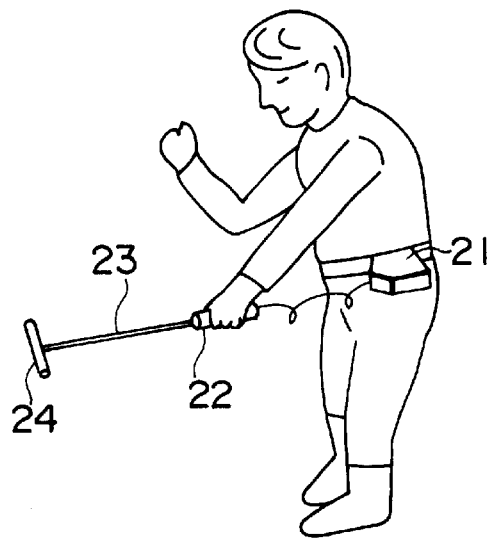

F I G. 16a
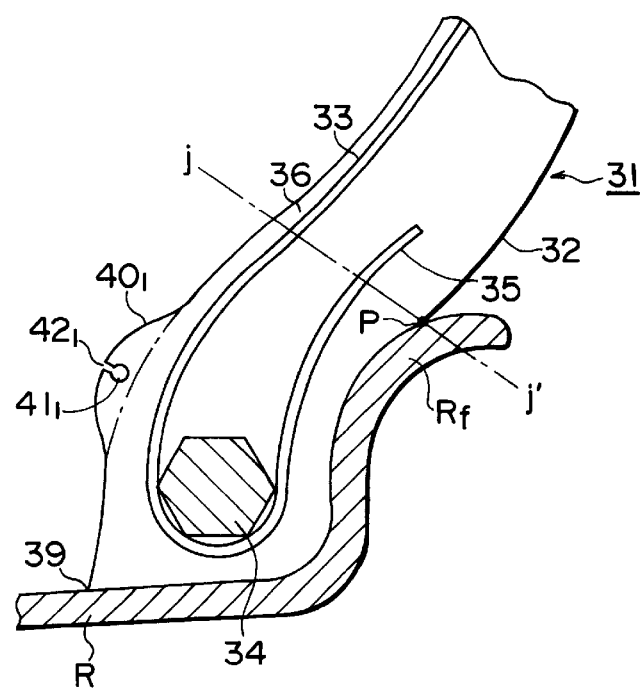
F I G. 16b
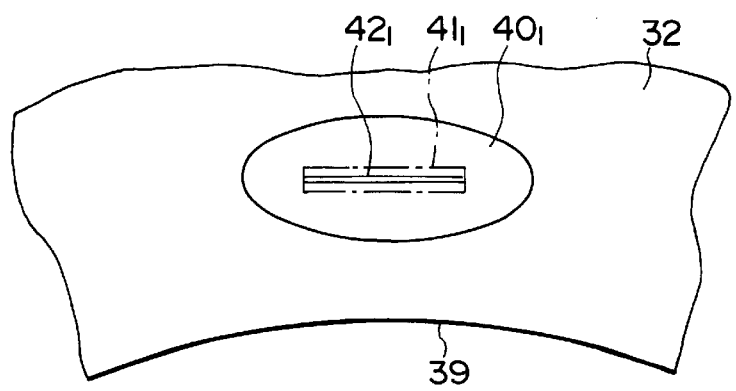

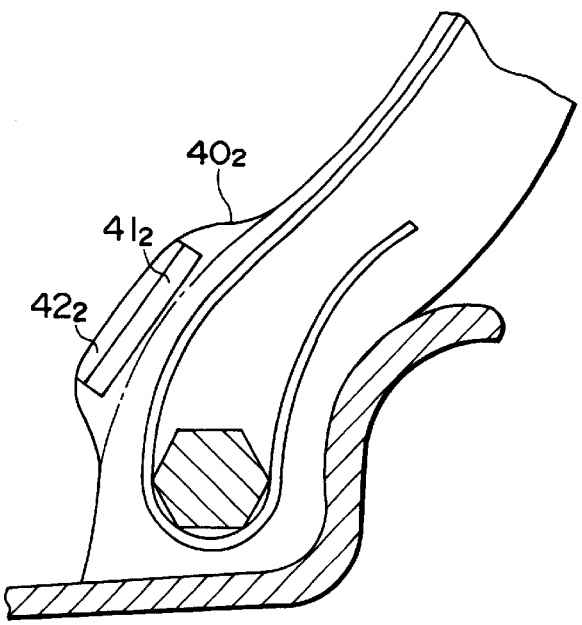
F I G. 17a
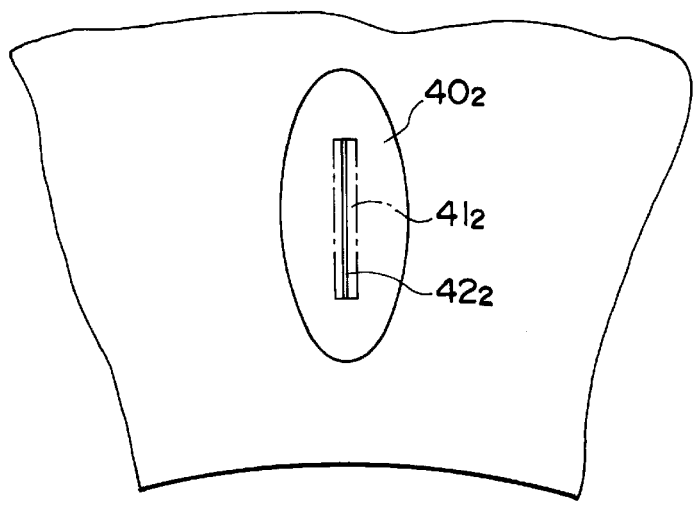
F I G. 17b

F I G. 18a
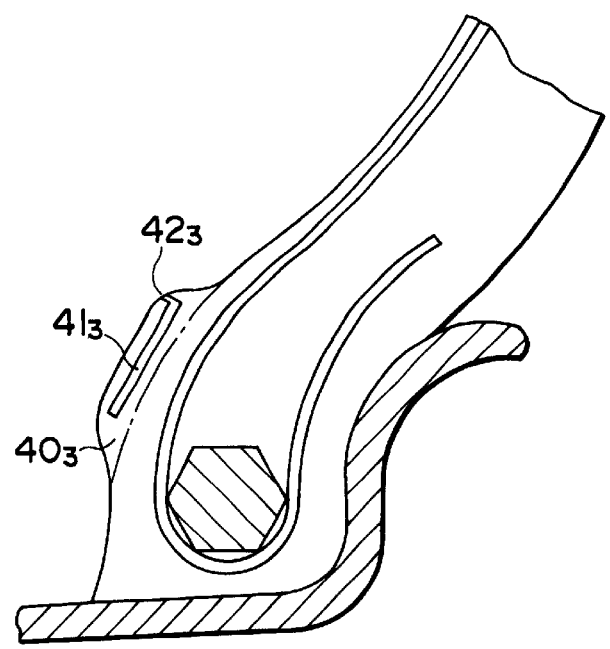
F I G. 18b
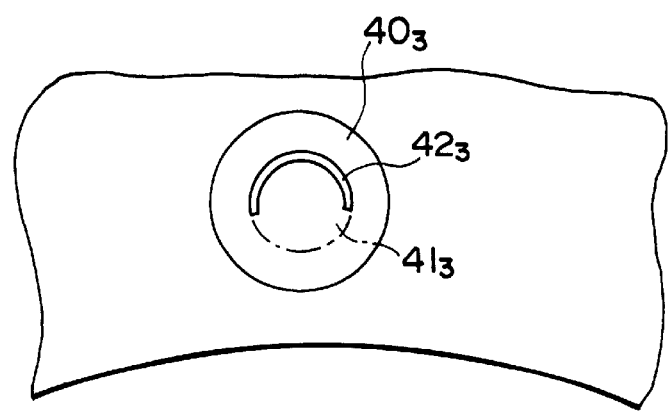

PNEUMATIC TIRE HAVING A TRANSPONDER THEREIN, AND A METHOD OF AND A DEVICE FOR READING AND WRITING OF A TRANSPONDER

This is a Continuation of application Ser. No. 08/291,076, filed Aug. 17, 1994.

BACKGROUND OF THE INVENTION

1. Field of the Invention

This invention relates to a pneumatic tire having a transponder therein for transmitting information concerning the tire, and to a method of and a device for reading and writing of a transponder.

2. Description of the Prior Art

The basic technique of a transponder which can transmit and receive at the same time has been established and has been adopted in various fields.

One application of the transponder is for pneumatic tires. The transponder is used in order to obtain information concerning the tire, inner pressure, temperature and the number of rotations, etc. For instance, a technique of receiving an information signal of the transponder after an electrical signal is transmitted to the transponder buried in the tire is shown in Japanese utility model application No. 2-123404.

The transponder comprises integrated circuits, coils and covers which protect this equipment. The shapes of the transponder can be coin shape, cylindrical shape, etc. and the transponder is relatively small. In the above application, edge portions of a carcass wound around bead cores and outer portions of the carcass in buttress portions (outer edge of a sidewall portion in a radial direction of the tire) are described for the portion in which the transponder is buried.

For adoption of the transponder to the tire, therefore, it is necessary to miniaturize the transponder and select locations to bury the transponder in view of durability carefully as well. For this reason, such limitations as described in the above mentioned application occur.

A device for reading and writing of the transponder (called reading device hereinafter) receiving and transmitting a signal to the transponder buried in a certain location is described in Japanese patent publication No. 4-501939 and U.S. Pat. No. 5,181,975.

Since the transponder is a foreign object to the tire, attention has to be paid to the durability when the transponder is buried in the tire. The internal environment of a tire is severe for electrical apparatus such as a transponder. Therefore, damage caused by an external force through the tire and heat generated in the tire should be prevented.

In the tire containing the transponder, the technique of communicating practically and stably with the transponder buried in the tire is a basic task. Further, an improvement of the durability which means protection of the transponder exposed in a severe environment such as the inside of the tire and deterioration of the tire caused by the transponder as well is necessary.

When reading and writing (called reading hereinafter) are done for the tire after dismounting from a vehicle, wherever the transponder is buried, reading can be done by searching all over the tire using devices described in the above mentioned applications or using a hand-held-reader, etc. If the location of the transponder is marked, the reading can be done much easier.

In the case of the reading for a tire mounted on a vehicle, the following should be considered:

1. The range which allows the reading of the transponder is restricted to about 30–50 cm;
2. The transponder has a strong directivity;
3. A clearance between the tire and the vehicle is restricted;
4. In dual tires, since the tires are adjacent each other, interference is easily generated.

After many studies concerning the construction of the tire and the transponder which provide excellent durability, the present inventors have found the following:

1. For minimization of the transponder to be buried in the tire, a cylindrical shape is preferable.
2. Installation of the transponder in the inner portion of the tire of the bead portion along an axial direction of the bead is preferable in order to prevent the above drawbacks as much as possible. This portion should not bring about disadvantages such as decreasing of range for reading and writing of the transponder caused by the interference of the transponder with steel cords.
3. Since conventional transponders are used for animals, and from a requirement of water resistance property, it is covered by glass. Because the glass container is not durable enough to stand shocks when rim assembling and disassembling and when running, covers with excellent durability should preferably be adopted. Also, a heat resistance property and water resistance property over a long period necessary for the tire are required.

SUMMARY OF THE INVENTION

The present invention in one aspect provides a pneumatic tire having a transponder therein, comprising a pair of sidewall portions and a crown portion toroidally arranged between a pair of bead cores, characterized in that the transponder is in a cylindrical glass container covered by a synthetic resin layer with a shock resistance property and is buried in a projected portion at the inner surface of a bead portion of the tire, and the axial direction of the transponder is along the circumferential direction of the tire.

The invention in another aspect provides a method of reading and writing of a transponder containing a rod antenna which is arranged at an inner surface of a tire and whose axial direction of the rod antenna is along the circumferential direction of the tire, characterized in that a rod antenna used for receiving and transmission for the transponder is moved while an axial line of the rod antenna is along the circumferential direction of the tire when the reading and writing is done from outside of the tire.

The invention in still another aspect provides a device for reading and writing of a transponder, comprising a rod antenna portion for receiving and transmission for the transponder and a main body for performing processing of a signal, characterized in that the rod antenna portion is connected to the main body through a stick which is generally perpendicularly joined to the rod antenna portion.

The invention in a further aspect provides a pneumatic tire, characterized in that a pocket for a transponder is formed in a projected portion at the inner surface of a bead portion of the tire.

The above aspects of the invention may also be used in any suitable combination thereof.

BRIEF DESCRIPTION OF THE DRAWINGS

FIGS. 1a and 1b show a transponder buried in a bead portion of a pneumatic tire, in accordance with one aspect of the invention;

FIG. 6 is a detailed view of the transponder used in the other aspect of the invention, partly cut away and partly in section;

FIGS. 13a, 13b and 13c show respective embodiments of rod antennae;

FIGS. 14a and 14b show further embodiments of rod antennae having covers;

FIGS. 15a, 15b and 15c show different embodiments of devices for reading and writing of a transponder;

FIGS. 16a and 16b show the location of a pocket for a transponder in a pneumatic tire, according to a further aspect of the invention;

FIGS. 17a and 17b show an alternative embodiment of the construction of FIG. 16; and FIGS. 18a and 18b show a further alternative embodiment of the construction of FIG. 16.

DESCRIPTION OF THE PREFERRED EMBODIMENTS

Figure 2:
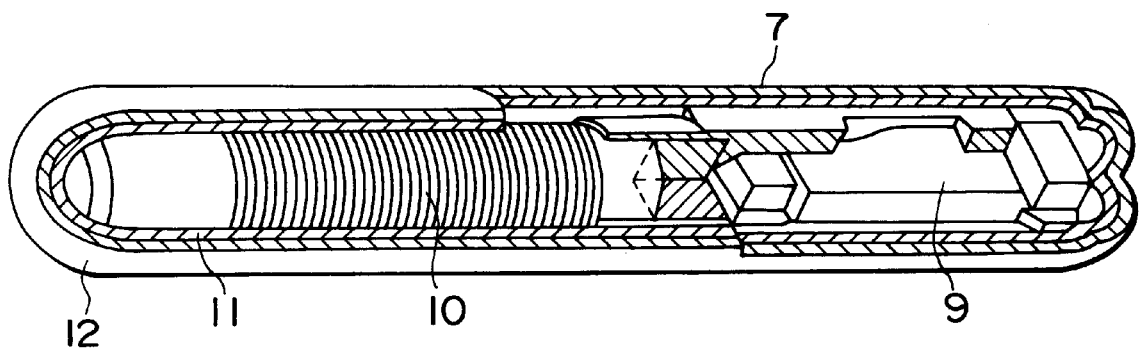
FIG. 2 shows in detail the transponder of FIG. 1, partly cut away and partly in section.

A first aspect of the present invention will be described with reference to FIGS. 1 to 4 of the drawings.

FIG. 1 shows a bead portion 1, a bead core 2, a carcass ply 3 wound around the bead core 2, a liner rubber 4 which is disposed at the inner surface of the carcass ply 3, and a sidewall rubber 5 which is disposed at the outer surface of the carcass ply 3.

A projected portion 6 whose shape is generally perpendicular to the inner side of the tire is formed at the inner surface of the bead portion 1, that is surface of the inner rubber 4. A transponder 7 is buried in the projected portion 6. The axial direction of the transponder is along the circumferential direction of the tire. The projected portion 6 is preferably formed at the surface of the liner rubber 4 between (i) a line l perpendicular to the carcass ply 3 from a point P which is a departing point of the bead portion 1 from a rim flange Rf when the tire is fitted with a rim R and (ii) a bead toe 8.

As shown in FIG. 2, the transponder 7 comprises a package 9 having an integrated circuit, an antenna 10, a cylindrical glass container 11, and a synthetic resin layer 12 with a shock resistance property covering the glass container 11. As a synthetic resin, polyphenylenesulfide (PPS), polybuteneterephthalate (PBT), polyethyleneterephthalate (PET) and ABS resin, etc. can be used. Other materials which have sufficient mechanical strength and formability can also be used.

The thickness tG (FIG. 3) of the glass container 11 is preferably 0.3–2.0 mm, and the thickness tP of the synthetic resin layer 12 is preferably 0.5–3.0 mm. If the thickness tG is less than 0.3 mm, the mechanical strength decreases; while if the thickness is more than 2.0 mm, the durability of the tire will be adversely affected because of the large diameter of the transponder. The thickness of the glass can be varied if only the water resistance property is provided.

If the thickness tP (FIG. 3) is less than 0.5 mm, the mechanical strength is decreased; while if the thickness is more than 3.0 mm, the durability of the tire will be adversely affected because of the large diameter of the transponder. The thickness of the resin layer 12 is determined from the standpoint of strength. The projected portion 6 is so shaped and has sufficient thickness that the transponder 7 is not located inside the inner rubber 4 and is not exposed outside the projected portion 6. The minimum distance d (FIG. 3) between the transponder 7 buried in the projected portion 6 and the carcass ply 3 is preferably 1.0–5.0 mm. If the minimum distance d is less than 1.0 mm, the range when reading decreases because of the deflection of the frequency. If the minimum distance d is more than 5.0 mm, the projected portion 6 enlarges resulting in deterioration of the performance of the tire. The relation of the minimum distance d and the reading range of the transponder is shown in FIG. 4. In this figure, when the transponder contacts the carcass ply by cutting the inner side of the tire (about 4 cm inside from the bead edge), d is 0. Then, the reading range is examined as the distance d is varied by inserting rubber sheets with thickness of 1–4 mm between the carcass ply and the transponder. When d is more than 1 mm, preferably more than 2 mm, a reading range can be sufficiently obtained. When the transponder without the synthetic resin layer (1 mm) covering the container directly contacts the carcass ply (d is approximately 1 mm), a reading cannot be achieved. Therefore, glass and synthetic resin do not have a function electrically, and only the distance between the antenna of the transponder and the carcass ply is relevant when reading.

Another aspect of the present invention will be explained with reference to FIG. 5. The technique of reading of the transponder buried in dual tires fitted to a truck is shown. When reading, a device comprising a main body 21 mounted on the waist of an operator, a grip 22, a stick 23 and a rod antenna 24 is used. In order to have access to the transponder, the rod antenna 24 joined to the stick 23 is moved along a tread surface by holding the grip 22. More preferably, an axial line of the rod antenna is moved along a circumferential line of the tire which runs along the center of the tread.

Since the transponder is buried so that the axis of the rod antenna thereof is along the circumferential direction of the tire, the axis of the rod antenna and the axis of the rod antenna of the reading device become parallel. This improves sensitivity of the reading.

In this other aspect of the present invention, the transponder is preferably buried at the inner surface of the tire of the bead portion which is fixed by the rim, that is the portion which does not adversely affect the performance of the tire.

For the transponder buried in this portion, in addition to durability for a load when rim assembling and disassembling and shock when running, water resistance property is required. Therefore, the transponder is preferably double covered. That is, the glass container is adopted inside for the purpose of airtightness and the water resistance, and the resin covering outside is adopted for the purpose of strength. This construction provides the strength and the water resistance for the transponder. Thus, the transponder can be buried in the bead portion of the tire.

Further, the location in which the transponder is buried is also restricted. In the electromagnetic induction type-transponder, the reading range is shorter caused by deflection of the frequency when the transponder approaches metals. Therefore the minimum distance between the transponder and the carcass ply is preferably more than at least 1.0 mm.

Figure 7:
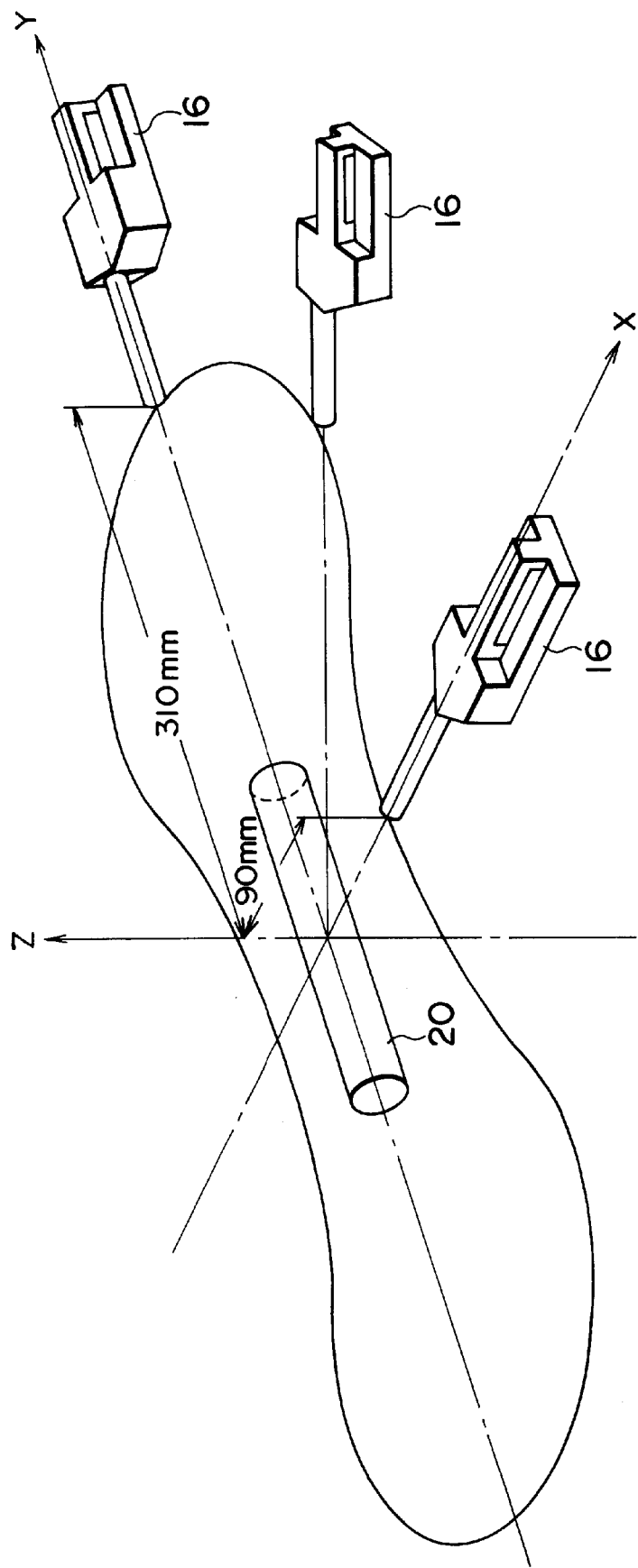
FIG. 7 is a view showing the directivity of the transponder.
Figure 8:
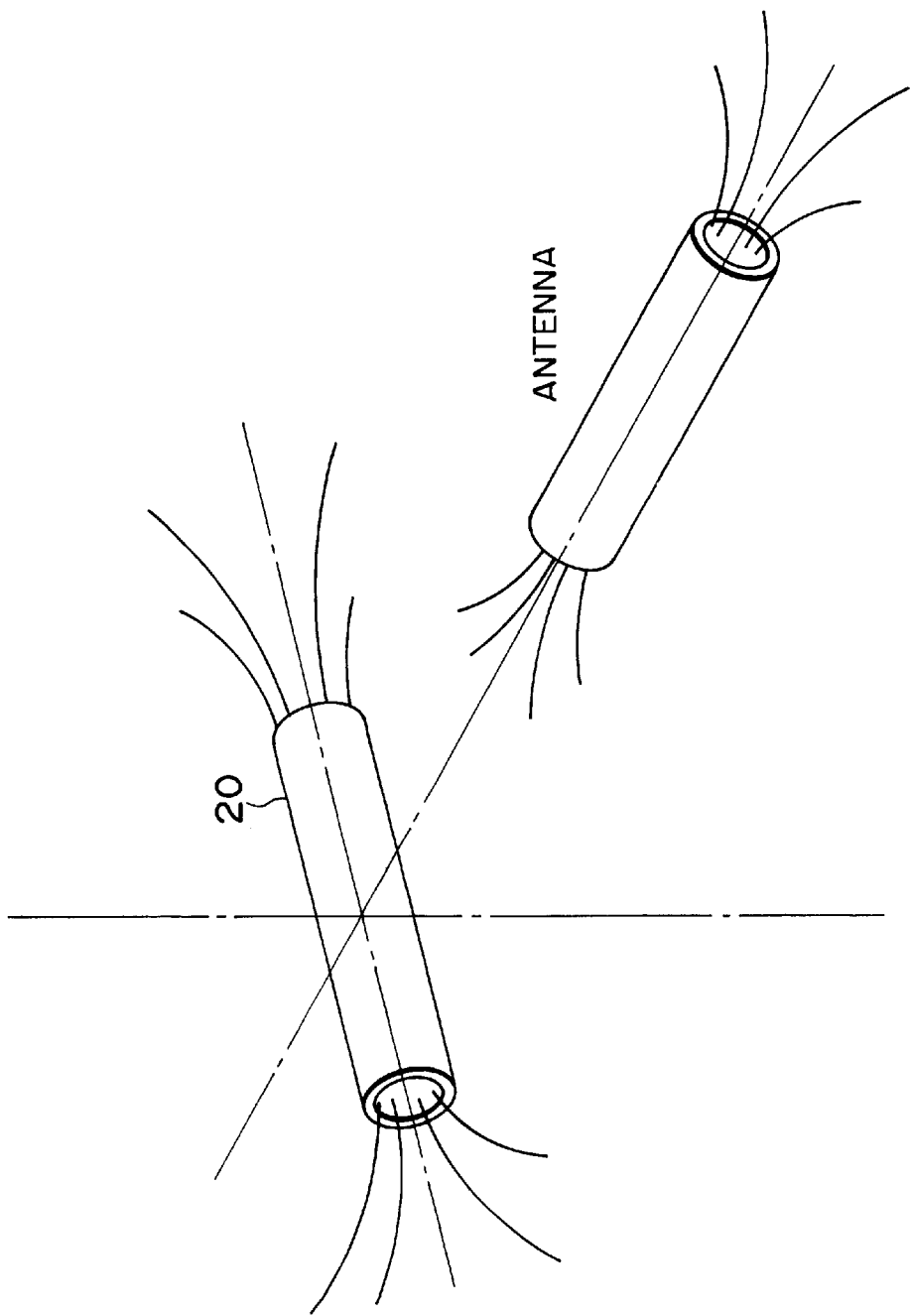
FIG. 8 is a view for explaining the directivity.

Investigation results of the directivity of the reading range of the transponder are shown in FIG. 7, when having access to a transponder 20 buried in a tire fitted to a vehicle by a hand-held-reader 16, which is conventionally used for reading the transponder. The reading range from the front side (X direction) is 90 mm, which is much shorter than that of 310 mm in the parallel direction (Y direction). This is because a magnetic field cannot be matched caused by orthogonal flux as illustrated in FIG. 8. Therefore an accurate reading from the Y direction having a strong directivity cannot be achieved because of the clearance between the tire and the reading range, etc.

Figure 9:
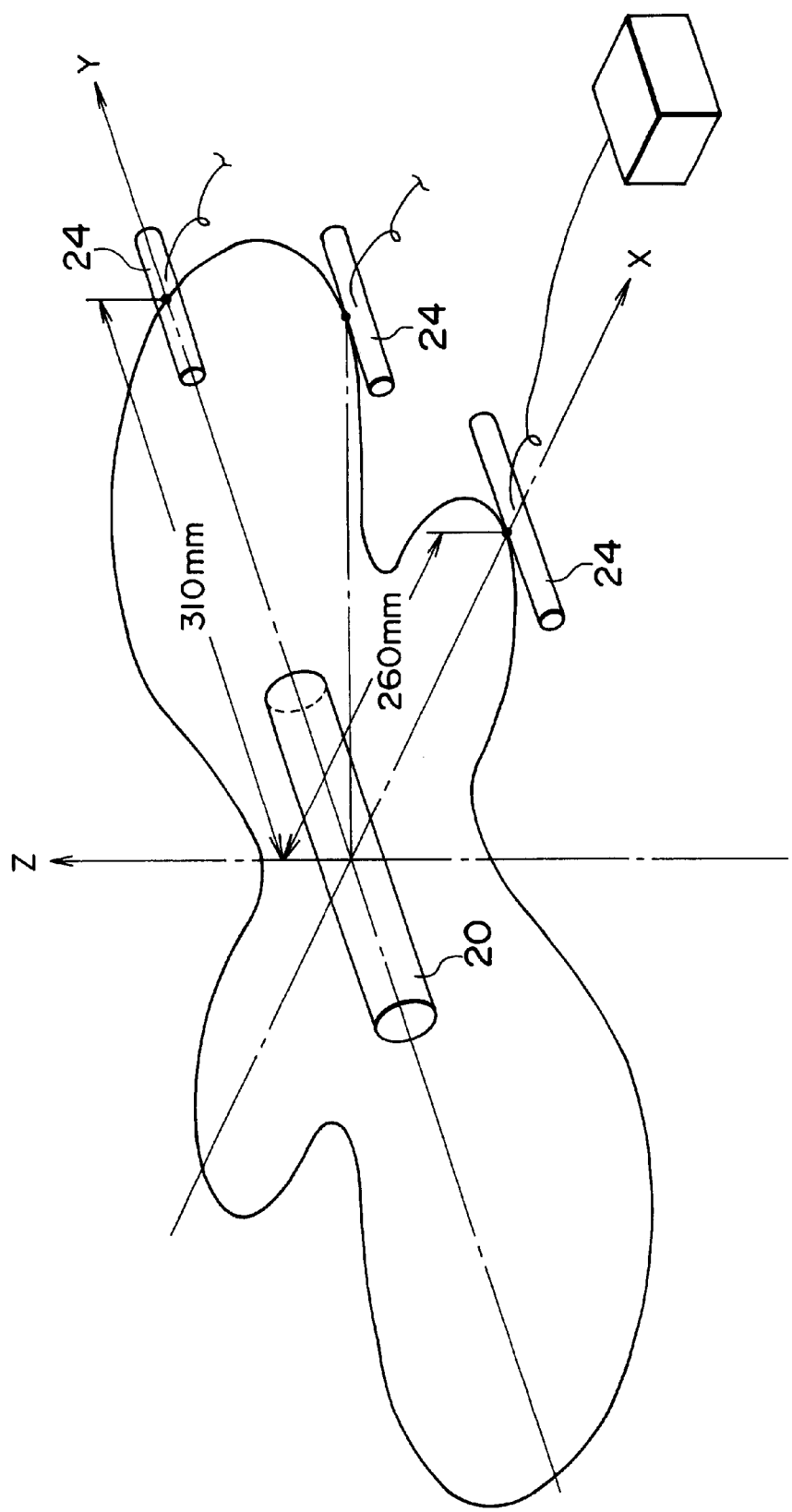
FIG. 9 is a view illustrating a way of reading the transponder.

After many studies of the directivity of reading of the transponder, the inventors have found that favourable results can be obtained by arranging the rod antenna 24 parallel to the axis of the transponder. When arranging the rod antenna and the transponder axis parallel as described in FIG. 9, the reading range from the front (X direction) is 260 mm, which is approximately triple. In this arrangement, communication can be achieved within a circular area with a radius of 260 mm surrounding the transponder. This makes it possible to achieve the reading of the transponder to relatively large tires such as truck tires.

The relation between the transponder and the area searched by the rod antenna of the reading device is explained below.

Figure 10:
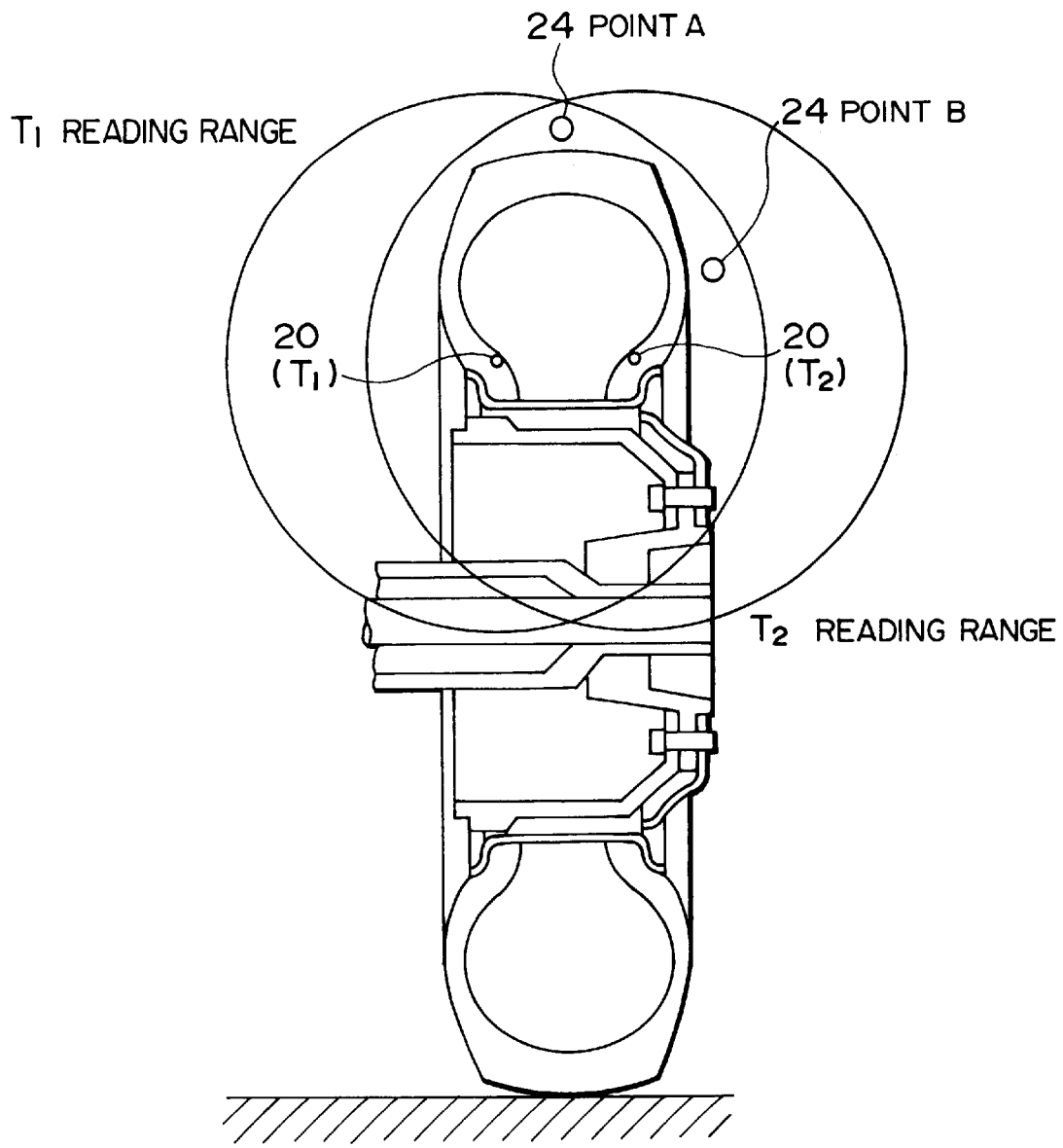
FIG. 10 is a view showing a searching area of a rod antenna.

If the transponder 20 is buried in either location T1, which is the inner side (vehicle side), or location T2, which is the outer side as shown in FIG. 10, searching once around the circumference of the tire using the rod antenna 24 within an overlapping area of circular areas T1 and T2, for instance Point A or B, makes it possible to have access. However, if the dual tires case mentioned next is taken into account, Point A, which is the circumference line of the tire along the center of the tread, is practically preferable.

Figure 11:
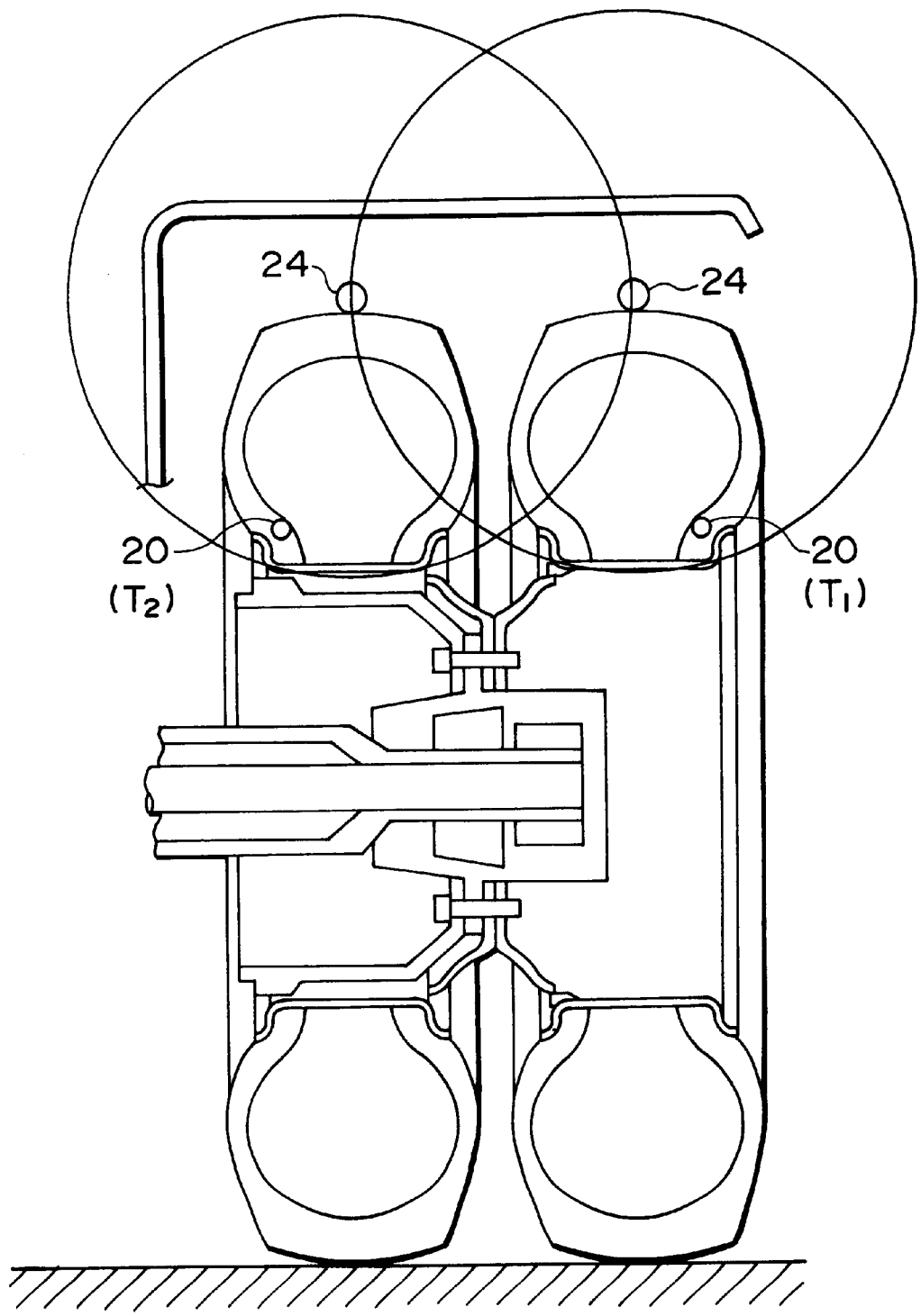
FIG. 11 is a view showing the location of transponders in a pair of pneumatic tires.
Figure 12:
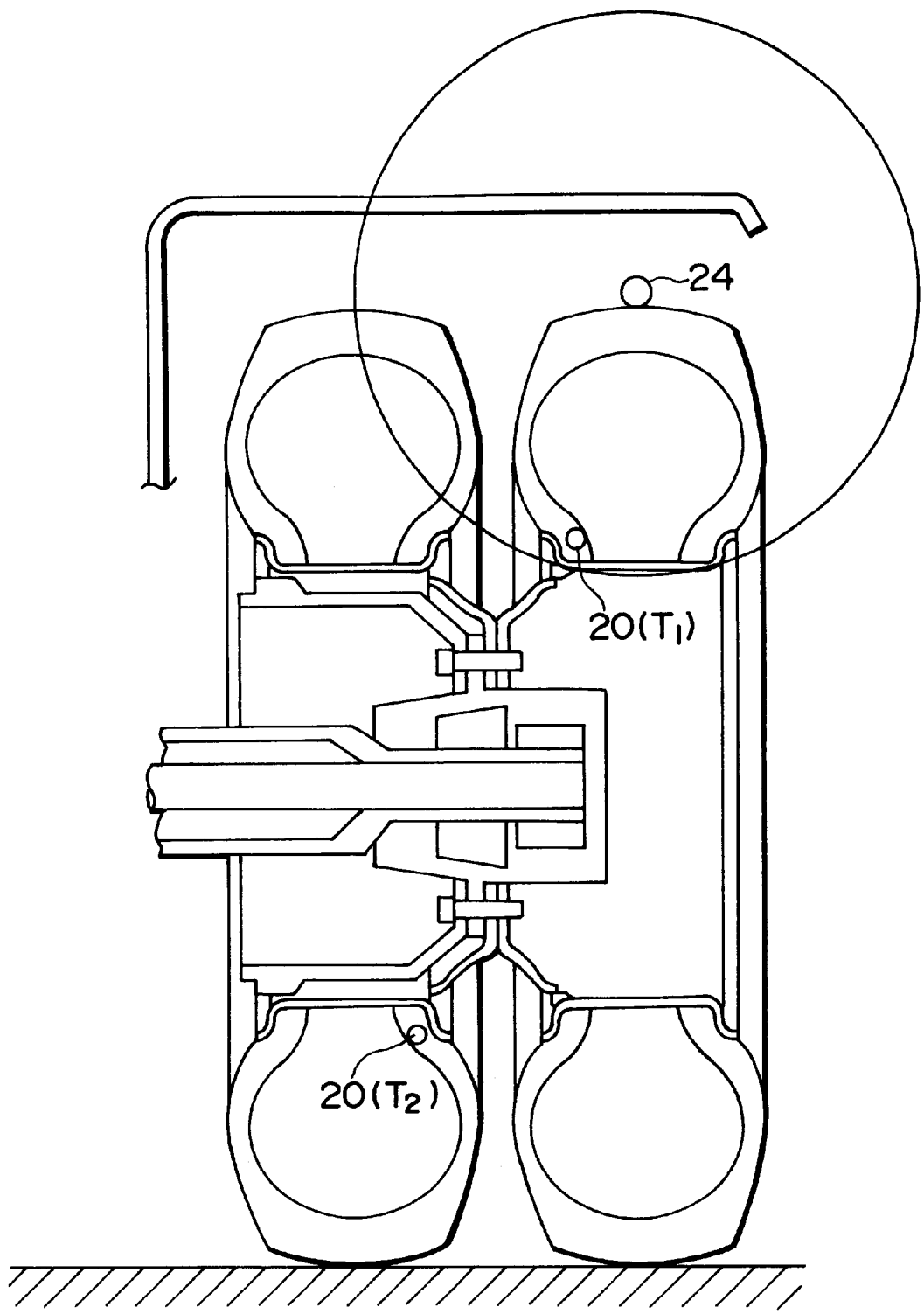
FIG. 12 is a view showing an alternative location of transponders in a pair of pneumatic tires.

The case of dual tires is shown in FIGS. 11 and 12. As in FIG. 10, the reading of the transponder buried in the dual tires can be also done. In this case, interference between the transponders buried in the inner tire and that of the outer tire accidentally prevents information of the transponder from being obtained in a desired condition. Therefore, in order to avoid this situation, by means of restricting locations of the transponders, generation of interference should be prevented. Accordingly, arrangements of the transponders in FIGS. 11 and 12 are recommendable.

In order to avoid the generation of the interference, in the outer tire the transponder 20 is buried in the outer bead (location T1) and, in the inner tire, the transponder is buried in the inner bead (location T2) as described in FIG. 11. In this case, markings on sidewalls which show the locations of the transponders are not necessary. In FIG. 12, the transponder can be buried in either the inner or outer side. The transponders are arranged away from one another at an angle of 180° in the circumferential direction of the tire. In this case, a distinction between the outer tire and the inner tire is drawn by putting markings which show the location of the transponders. The combined use of FIG. 11 and FIG. 12 is also possible, and, further, many variations can be adopted. The point is that the arrangement must not generate interference.

Reading devices are shown in FIG. 13 and FIG. 14. In FIG. 13a, a stick 23 which is long enough to reach inside the dual tires is connected to the center of the rod antenna 24 in the axial direction. In FIG. 13b, the axis of the rod antenna is curved along the surface of the tread of the tire. In FIG. 13c, the stick 23 is connected to the end of the rod antenna 24 in the axial direction. Further, in order to move the device smoothly along the surface of the tread of the tire, covers 17 may be attached, as shown in FIG. 14a and 14b.

In FIG. 15, types of the device are shown. A main body 21 which is fixed to the waist of a user is shown in FIG. 15c; a main body 21 which is hung on a shoulder is shown in FIG. 15b; and a main body 21 and a rod antenna 24 which are fixed together is shown in FIG. 15a, that is the main body and the rod antenna are directly fixed together without using wires or the like.

The projected portion having a pocket for the transponder is preferably located at an area away from the main portion of the tire where movement of the inner surface of the tire is small when running. Thus, the tire performance is not adversely affected. Moreover, the transponder can be inserted and removed easily, so that inspection and exchange of the transponder can be easily carried out if necessary.

Figure 3:
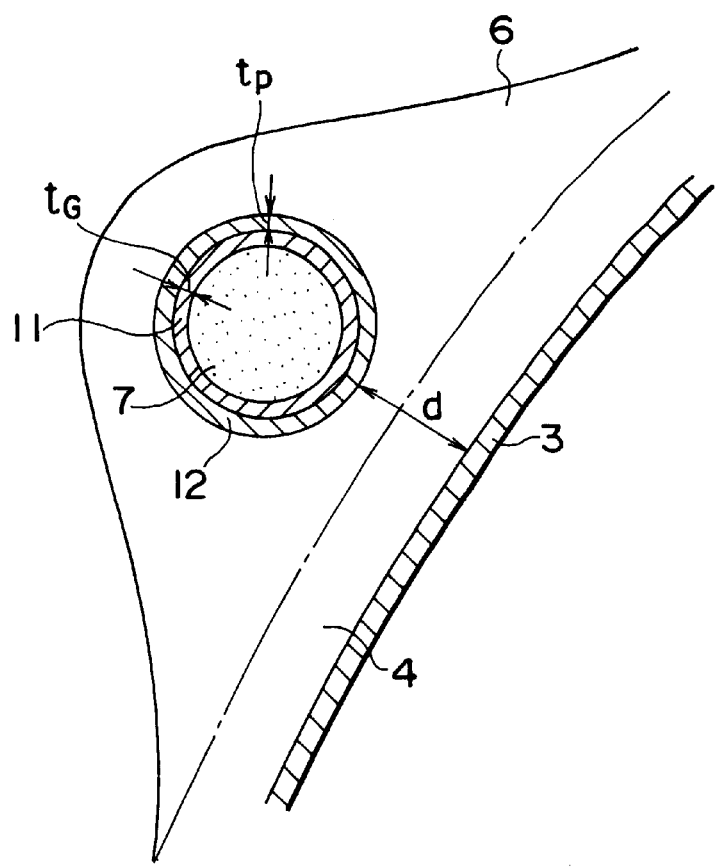
FIG. 3 is an enlarged view of a part of FIG. 1a, showing the transponder buried in the projected portion of the tire.
Figure 4:
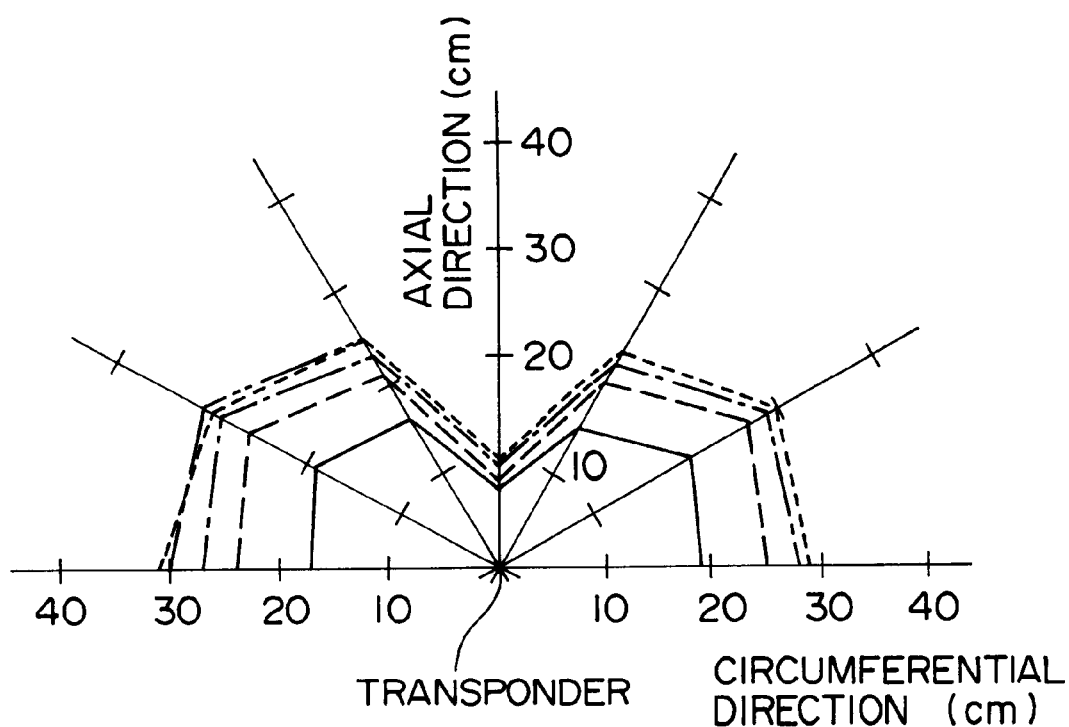
FIG. 4 is a schematic view representing the relation between a reading range of the transponder and the distance between the transponder and a carcass ply of the tire.

A transponder of the type shown in FIGS. 1 to 3 was buried in a location where the distance d was 2.0 mm in a steel radial tire of 11R22.5 for a truck. As the transponder, RI-TRP-WRHC of Texas Instruments Inc. having a synthetic resin layer with thickness 1 mm formed by injection molding was used. As the synthetic resin layer, PPS was used.

For the above mentioned tire, after rim assembling and disassembling many times forcing a load, the durability of the transponder was checked. No problems were observed. As a comparison, the same transponder without a cover of the synthetic resin layer was tested in the same manner. The glass container was broken when rim assembling in this case.

Next, a drum test was carried out for the tire. The transponder did not damage the durability of the tire.

Further, a reading test was done using a hand-held-reader of Texas Instruments Inc. In this case, the reading and writing range of the transponder did not decrease so much, even in an embedded situation in the tire.

The transponders (RI-TRP-WRHC of Texas Instruments Inc.) were buried in locations shown in FIG. 11 of dual steel radial tires of 11R22.5 for a truck.

Figure 5:
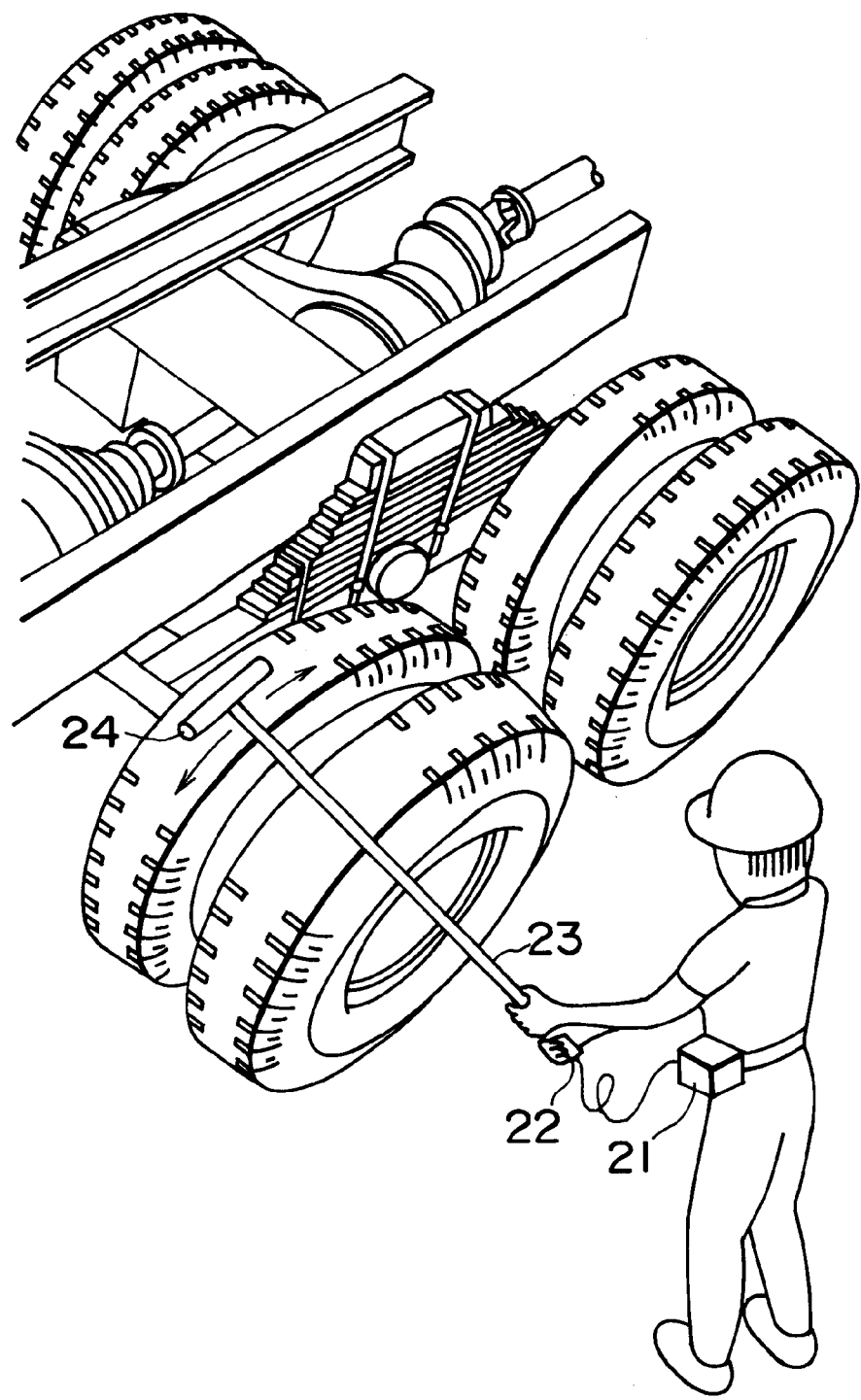
FIG. 5 is a perspective view illustrating a method and a device for reading and writing of a transponder, according to another aspect of the invention.

For the transponders buried in the dual tires fitted to the truck, the reading test was done by a device having the rod antenna shown in FIG. 13a in the manner shown in FIG. 5. The rod antenna had a diameter of 21 mm, a length of 140 mm and an inductance of 27 $\mu$H.

In the above test, particular information stored in the transponders could be read with a distinction between the outer tire and the inner tire.

As a comparison, a reading test by a conventional hand-held-reader shown in FIG. 7 was done. The reading of the transponder buried in the inner tire could not be achieved because the hand-held-reader could hardly approach the inner tire through a clearance between the tire and the fender of the tire. According to the present invention, the rod antenna could be put into the clearance easily, so that the reading of the transponder of the inner tire could be carried out.

FIG. 16a is a sectional view of a part of a tire 31 of the further aspect of the present invention, and FIG. 16b is a side view.

In FIG. 16a, the tire 31 comprises a carcass 33 extending toroidally whose edges, forming turn-up portion 35 of the carcass ply, are turned up around bead cores 34 from inside to outside in the circumferential direction of the tire. A liner rubber 36 covers the inner side of the carcass 33 wholly.

In the present invention, a projected portion 40 having a pocket 41 is formed at the inner surface of an extension line of the outer periphery of the liner rubber at the inner surface of the bead portion 32. The projected portion 40 is preferably formed at the bead portion between (i) a line j–j' perpendicular to the carcass ply from a point P which is a departing point of the bead portion 32 from a rim flange Rf when the tire is fitted with a rim R and (ii) a bead toe 39.

Although the shape of the projected portion depends on that of the transponder, it is cylindrical as shown in FIG. 6. When the transponder is buried in the circumferential direction of the tire, the shape of the projected portion becomes an elliptical shape long from side to side as shown in FIG. 16b.

As shown in FIG. 6, the transponder 20 comprises a package 13 having an integrated circuit, an antenna 14, and a tube made of a glass or synthetic resin or a cover 15. The diameter and the length of the tube 15 are preferably respectively 4 mm and 25 mm. Therefore, the diameter and the length of the pocket $41_1$ (FIG. 16) should be equal to or a little larger than that of the transponder. Mark $42_1$ denotes an entrance extending in the center of the pocket $41_1$ along the whole length having a small opening. It is not preferable if the entrance is too large since the transponder may occasionally fall out when running.

A second embodiment is shown in FIGS. 17a and 17b. In this embodiment, the pocket $41_2$ and the entrance $42_2$ are arranged along a radial direction of the tire, so that the projected portion $40_2$ has the elliptical shape in the radial direction.

A third embodiment is shown in FIGS. 18a and 18b. In this embodiment, a pocket $41_3$ is formed for an arcuate shape transponder. Therefore the shape is circular, and an entrance $42_3$, which is a little larger than 180°, is formed in the upper portion (outer in the radial direction of the tire) along a circumference of the pocket. The projected portion $40_3$ has a mound shape.

In order to manufacture this tire, when forming the tire, a male mold made of metal having the pocket and entrance is embedded into rubber of a green tire after mold lubricants are applied. Afterward, vulcanization forming is done by molds. When vulcanizing, it is preferable to use bladders which have depressions corresponding to the shape of the projected portion.

According to the present invention, a transponder can be buried in a pneumatic tire without adversely affecting tire performance, and the performance and durability of the transponder, and pneumatic tires having transponders therein which are able to be used practically are achieved.

According to the invention, the projected portion having a pocket for the transponder is located at an area away from the main portion of the tire where movement of the inner surface of the tire is small when running. Thus, the tire performance is not adversely affected by having the transponder in the tire. Also, the transponder is not damaged during production of the tire. Moreover, in addition to adequate protection of the transponder in the pocket, the transponder can be inserted and removed easily, so that an inspection and exchange of the transponder can be done easily if necessary.

While the invention has been particularly shown and described with reference to certain preferred embodiments thereof, it will be understood by those skilled in the art that various changes and modifications may be made without departing from the spirit and scope of the invention.

We claim:

1. A method of reading and writing of a transponder containing a rod antenna which is arranged at an inner surface of a tire and an axial direction of the rod antenna is along the circumferential direction of the tire, comprising the steps of; using an external rod antenna for receiving and transmitting to the transponder in the tire, positioning said external rod antenna such that an axial line of the external rod antenna is along the circumferential direction of the tire; moving the external rod antenna along the circumferential direction and reading and writing to and from said transponder from outside of the tire.

2. The method of claim 1 wherein, said external rod is positioned over a tire tread and substantially along a centerline line of said tread in the circumferential direction of said tire.

3. The method of claim 1 wherein, said external rod is positioned adjacent a sidewall portion of said tire.

* * * * *